(12) United States Patent
Nemer et al.

(10) Patent No.: US 10,146,500 B2
(45) Date of Patent: Dec. 4, 2018

(54) TRANSFORM-BASED AUDIO CODEC AND METHOD WITH SUBBAND ENERGY SMOOTHING

(71) Applicant: DTS, Inc., Calabasas, CA (US)

(72) Inventors: Elias Nemer, Irvine, CA (US); Jeffrey K. Thompson, Sammamish, WA (US); Antonius Kalker, Mountain View, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

(21) Appl. No.: 15/253,646

(22) Filed: Aug. 31, 2016

(65) Prior Publication Data

US 2018/0060023 A1  Mar. 1, 2018

(51) Int. Cl.
| | | |
|---|---|---|
| G06F 17/00 | (2006.01) | |
| G06F 3/16 | (2006.01) | |
| G10L 19/032 | (2013.01) | |

(52) U.S. Cl.
CPC ............ *G06F 3/165* (2013.01); *G10L 19/032* (2013.01)

(58) Field of Classification Search
CPC ................................. G06F 3/165; G10L 19/032
See application file for complete search history.

(56) References Cited

U.S. PATENT DOCUMENTS

| | | | |
|---|---|---|---|
| 8,838,442 B2 | 9/2014 | Terriberry et al. | |
| 2004/0070523 A1* | 4/2004 | Craven | G11B 20/00992 |
| | | | 341/50 |
| 2007/0016405 A1* | 1/2007 | Mehrotra | G10L 19/0212 |
| | | | 704/203 |
| 2008/0043861 A1* | 2/2008 | Moffatt | H04L 27/2618 |
| | | | 375/260 |
| 2008/0312759 A1 | 12/2008 | Koishida et al. | |
| 2009/0083046 A1 | 3/2009 | Mehrotra et al. | |
| 2010/0292993 A1 | 11/2010 | Vaillancourt et al. | |
| 2011/0173012 A1 | 1/2011 | Rettelbach et al. | |
| 2011/0035212 A1* | 2/2011 | Briand | G10L 19/0212 |
| | | | 704/203 |
| 2011/0270616 A1* | 11/2011 | Garudadri | G10L 19/02 |
| | | | 704/500 |
| 2012/0232909 A1 | 9/2012 | Terriberry et al. | |

(Continued)

OTHER PUBLICATIONS

International Search Report in corresponding PCT Application No. PCT/US2017/49484, filed Aug. 30, 2017, 26 pages.

*Primary Examiner* — Joseph Saunders, Jr.
*Assistant Examiner* — Joseph Saunders
(74) *Attorney, Agent, or Firm* — Craig S. Fischer

(57) ABSTRACT

A transform-based codec and method with energy smoothing for mitigating vector quantization errors (such as "birdies") during the encoding process. Embodiments of the codec and method use an encoder to apply in combination an orthogonal transformation and a vector permutation to frequency transform coefficients. In some embodiments the transformation is performed first followed by the permutation and in other embodiments the order is reversed. The order used is reversed at the decoder. A smoothing parameter containing the level of energy smoothing to be applied is passed from the encoder to the decoder and used by both to compute a transform matrix and an inverse transform matrix. In some embodiments the transform matrix is a fraction Hadamard matrix that is invertible, energy preserving, controllable, and stable.

16 Claims, 13 Drawing Sheets

(56) References Cited

U.S. PATENT DOCUMENTS

| | | | |
|---|---|---|---|
| 2012/0265541 A1* | 10/2012 | Geiger | G10L 19/0212 704/500 |
| 2013/0006645 A1* | 1/2013 | Jiang | H03M 7/3082 704/500 |
| 2013/0132100 A1 | 5/2013 | Sung et al. | |
| 2014/0074486 A1 | 3/2014 | Disch et al. | |
| 2014/0142956 A1 | 5/2014 | Briand et al. | |
| 2015/0213808 A1 | 7/2015 | Disch et al. | |
| 2015/0332686 A1 | 11/2015 | Disch et al. | |
| 2015/0332697 A1* | 11/2015 | Disch | G10L 21/038 704/205 |

\* cited by examiner

TRANSFORM-BASED AUDIO CODEC AND METHOD WITH SUBBAND ENERGY SMOOTHING

BACKGROUND

Digital audio coding (also called "digital audio compression") is a variety of techniques for minimizing the size of audio data prior to storage (to reduce storage requirements) or transmission (to reduce bandwidth requirements). Perceptual audio coding techniques take in consideration how humans actually perceive sound and give more attention to frequencies of an audio signal that humans hear most clearly and to less attention to frequencies that humans are less likely to notice any difference.

One class of digital audio coding is known as transform-based coding. Transform-based audio coding transforms a time signal into a frequency-domain vector of coefficients prior to quantization and encoding. One common type of transform is the modified discrete cosine transform (MDCT). The MDCT is a lapped transform, meaning that the transform is performed on blocks that overlap, and mitigates audible artifacts that occur at block boundaries. The MDCT is used in several lossy audio codecs and techniques.

The MDCT coefficients representing a given subband are typically quantized using a vector quantization (VQ) technique. The VQ uses a minimum mean square error (MMSE) approach to capture as many of the coefficients as possible given a number of available bits. The MMSE approach is an estimation method that seeks to minimize the mean square error. In the upper frequency spectrum of a typical audio signal the subbands are noise-like and each upper subbands contain a large number of non-zero transform coefficients.

Problems arise, however, when transform coefficients in a subband are quantized in a coarse manner. In particular, the upper subbands of an audio signal typically are allocated a lower number of bits than the lower subbands. If the VQ technique does not have available bits to vector-quantize a given subband then often only a single coefficient will be quantized, effectively creating a single-coefficient subband. At the decoder, instead of recreating a noise-like signal in this subband, the single-coefficient subband will have a "tonal" sound. Because the single-coefficient moves in time and frequency it creates a "musical noise" or "birdie" artifact. This musical noise or birdie artifact reveals itself to a listener as metallic tones that randomly appear and disappear in the played back audio content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the transform-based codec and method with energy smoothing are used to encode and decode and audio signal in a manner that eliminates birdie artifacts and musical noise. Embodiments of the codec and method make use of a transformation process in combination with permutation process. The orthogonal transformation process is controllable meaning that a level of energy smoothing can be applied as desired. The level of energy smoothing is determined at the encoder side. A smoothing parameter containing the level of energy smoothing to be applied is passed from the encoder to the decoder.

The smoothing parameter is used to construct a transform matrix used by the encoder in the orthogonal transformation process and an inverse transform matrix used by the decoder in the inverse transform process. The transform matrix used is of a class of matrices that are invertible, energy preserving, controllable (such that the level of energy smoothing can be designated), and stable such that the matrix is robust to quantization noise. In some embodiments the type of transform matrix used is a fractional Hadamard matrix. Moreover, in some embodiments the size of the orthogonal transformation is any power of 2 greater than or equal to 4.

Embodiments of the codec and method have several advantages over current solutions. First, the overall computation complexity is reduced compared to many existing solutions. This is due in part to the use of specific types of transform matrices and the size of the orthogonal transformation. Moreover, the computational complexity is reduced through the use of a combination of orthogonal transformation and vector permutation. Second, overall performance of embodiments of the codec and method are a bit improved when testing over a large database across many bed mixes and bitrates.

Embodiments include a method for processing an audio signal by using an encoder to apply both an orthogonal transformation and a vector permutation to frequency transform coefficients of the audio signal. In some embodiments the transformation is applied first followed by the permutation. In other embodiments the permutation is applied first followed by the transformation. In some embodiments the size of the transformation is any power of 2 greater than or equal to 4. The processed coefficients are quantized and packed into an encoded bitstream for storage, transmission, or both. A decoder is used to process the encoded bitstream and reverse operations of the encoder and recover the audio signal.

In some embodiments the orthogonal transformation is variable and is controlled by a smoothing parameter than contains a level of energy smoothing to be applied. The smoothing parameter is a function of at least one codec metric. The level of smoothing is communicated to the decoder and both encoder and decoder can then use the exact same level of energy smoothing. The level of smoothing is determined each frame at the encoder. The decision is based on a spectral analysis of the frequency spectrum of the audio signal and by measuring whether this spectrum has a tonal structure or a noise-like structure. In order to determine this, a flatness measure is computed in each subband and averaged across all the subbands. Based on this measure, in some embodiments 4 levels of smoothing are determined. Namely, the 4 levels are no smoothing, light smoothing, medium smoothing, and heavy smoothing.

In some embodiments the orthogonal transformation and the vector permutation are applied only once, while in other embodiments they are applied multiple times. The latter typically occurs when the size of the vector of frequency transform coefficients is not a multiple of the transform matrix size. Moreover, in some embodiments the vector permutation is achieved by interleaving. Interleaving is the process of rearranging the coefficients (or elements) of a vector according to a given rule. In some embodiments the rule is deterministic and in other embodiments the rule is probabilistic.

Embodiments also include a method for encoding an audio signal by dividing the audio signal into a plurality of frequency subbands and computing a transform matrix for each subband. An orthogonal transformation then is applied by the encoder to frequency transform coefficients in each subband using the transform matrix. The orthogonal transformation has a size is any power of 2 greater than or equal to 4. In addition, the encoder applies interleaving to the frequency transform coefficients to obtain processed frequency transform coefficients. The processed coefficients are vector quantized and then bit packed into an encoded bitstream that is representative of the audio signal.

Embodiments of the encoder also include computing a spectrum flatness for each subband and determining a smoothing parameter from the spectrum flatness that includes an energy smoothing level that represents an amount of energy smoothing to apply to each subband. This smoothing parameter is transmitted in the encoded bitstream from the encoder to the decoder. The smoothing parameter in some embodiments is used to compute the transform matrix. In particular, a transform parameter used to compute the transform matrix is a function of the smoothing parameter, the length of the current subband being processed, and the number of pulses of the vector quantizer.

Embodiments of the decoder also include decoding an encoded bitstream representing an audio signal by applying an inverse transform matrix and an inverse permutation to each subband of the audio signal. Using the resultant recovered frequency transform coefficients, the audio signal is reconstructed to obtain a recovered audio signal. The recovered audio signal is played back on playback device.

Also received with the encoded bitstream is the smoothing parameter that is used to compute a transform matrix that is used to generate the inverse transform matrix. This is achieved by inverting the transform matrix to obtain the inverse transform matrix and applying the inverse transform matrix in accordance with the level of energy smoothing. Moreover, the decoder applies the inverse transform matrix and the inverse permutation in a reverse order to that applied by the encoder.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of a transform-based codec and method with energy smoothing reference is made to the accompanying drawings. These drawings shown by way of illustration specific examples of how embodiments of the transform-based codec and method with energy smoothing may be practiced. It is understood that other embodiments may be utilized and structural changes may be made without departing from the scope of the claimed subject matter.

I. System and Operational Overview

Embodiments of the transform-based codec and method with energy smoothing are used to reduce and mitigate artifacts caused by vector quantization during encoding. This is achieved applying a combination of orthogonal transformation and vector permutation to frequency transform coefficients of an audio signal. An overview of embodiments of the codec and method will now be discussed.

Figure 1:
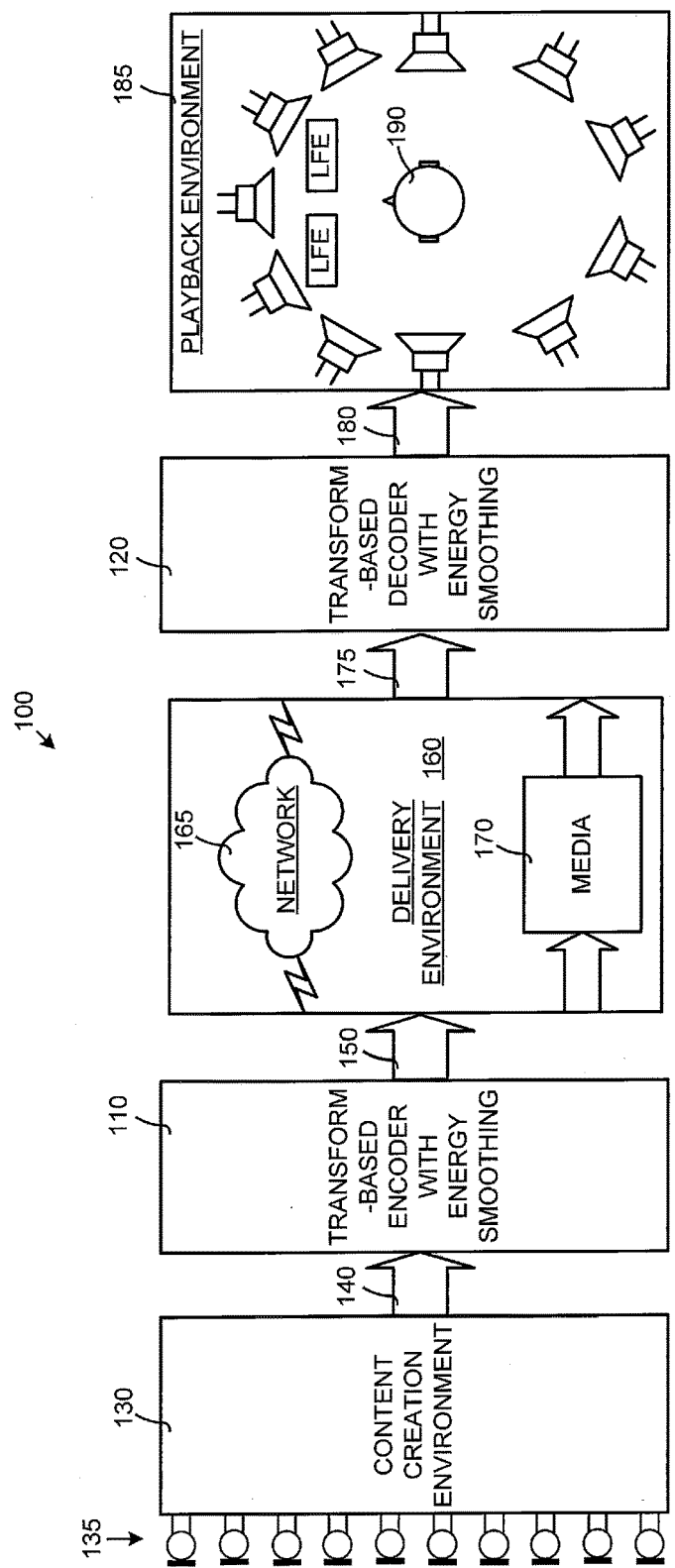
FIG. 1 is a block diagram illustrating a general overview of embodiments of the transform-based codec and method with energy smoothing.

FIG. 1 is a block diagram illustrating a general overview of embodiments of the transform-based codec and method with energy smoothing. Referring to FIG. 1, the codec 100 includes a transform-based encoder with energy smoothing 110 and a transform-based decoder with energy smoothing 120. Initially, audio content (such as musical or vocal tracks) is created in a content creation environment 130. This environment 130 may include a plurality of microphones 135 (or other sound-capturing devices) to record audio sources. Alternatively, the audio sources may already be a digital signal such that it is not necessary to use a microphone to record the source. Whatever the method of creating the sound, the output of the content creation environment 130 is an audio signal 140.

The audio signal 140 then is encoded using the transform-based encoder with energy smoothing 110. The encoder 110 is typically located on a computing device having one or more processing devices. The encoder 110 encodes the audio signal 140 using the system and method described herein to generate an encoded bitstream 150.

The encoded bitstream 150 is delivered for consumption by a listener through a delivery environment 160. Several delivery options are available, including streaming delivery over a network 165. Alternatively, the encoded bitstream 150 is stored on a media 170 (such as optical disk) for consumption by the listener. In addition, there are many other delivery options not enumerated here that may be used to deliver the encoded bitstream 150.

Figure 4:
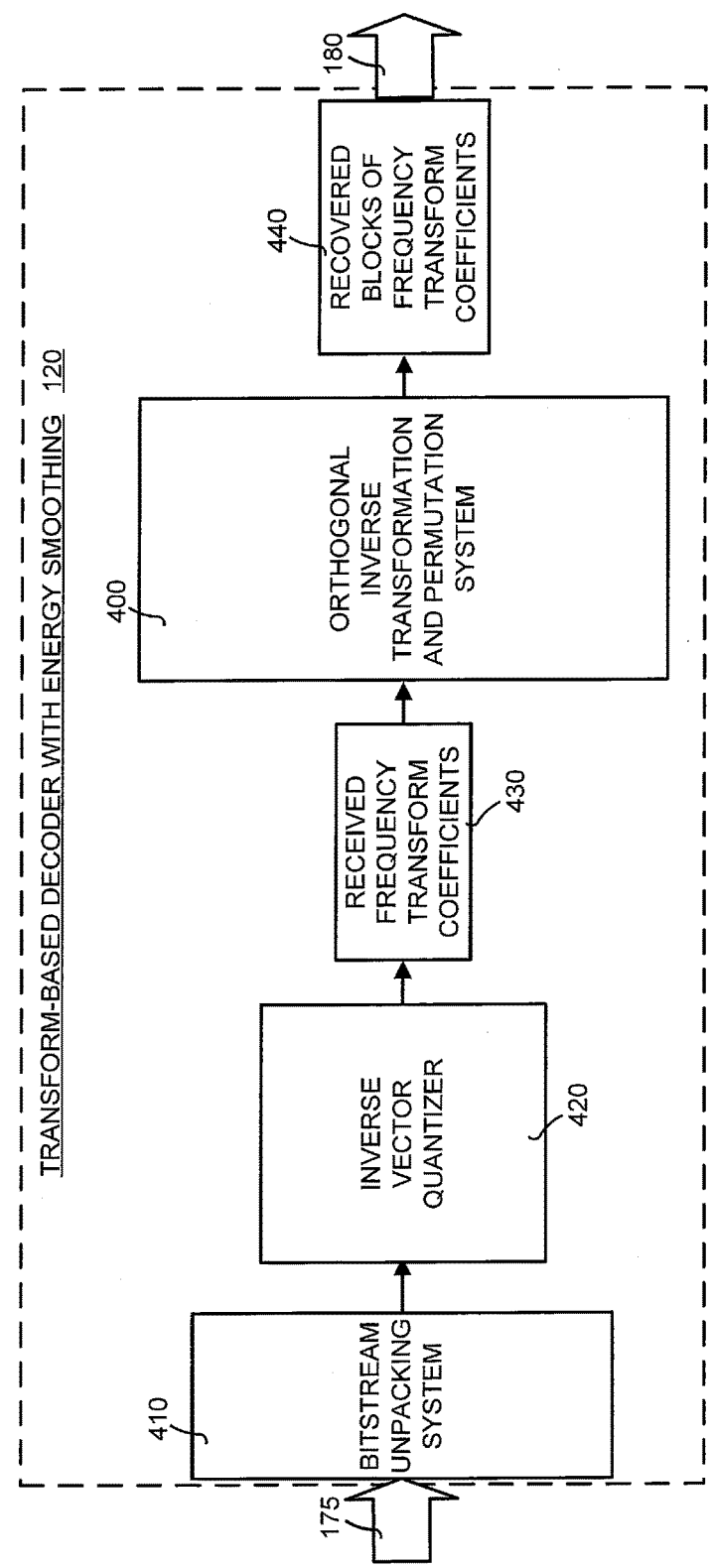
FIG. 4 is a block diagram illustrating the details of embodiments of the transform-based decoder with energy smoothing shown in FIG. 1.

The output of the delivery environment 160 is a transmitted encoded bitstream 175 that is input to the transform-based decoder with energy smoothing 120. The decoder 120 decodes the transmitted encoded bitstream 175 to obtain a recovered audio signal 180. Embodiments of the decoder 120 are typically located on a computing device having one or more processing devices. The recovered audio signal 180 is reproduced in a playback environment 185 that includes a playback speaker (or channel) layout. The playback speaker layout may or may not be the same as the content creation speaker layout. The playback speaker layout shown in FIG. 4 is an 11.2 layout and the environment 185 includes a listener 190. In other embodiments, the playback speaker layout may be headphones such that the speakers are merely virtual speakers from which sound appears to originate in the playback environment 185. For example, the listener 190 may be listening to the recovered audio signal 180 through headphones. In this situation, the speakers are not actual physical speakers (except for the headphones) but sounds appear to originate from different spatial locations in the playback environment 185 corresponding, for example, to an 11.2 surround sound speaker configuration.

Figure 2:
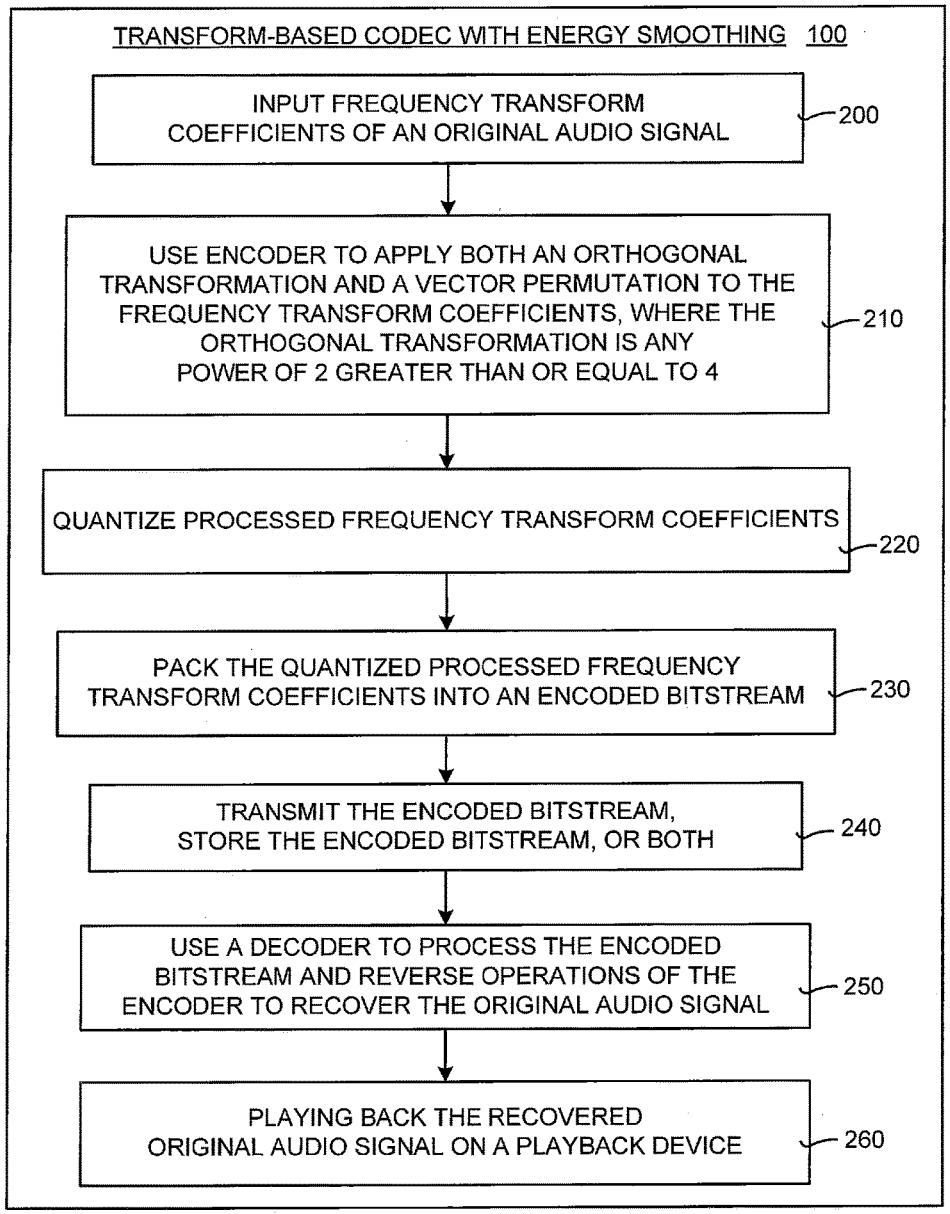
FIG. 2 is a flow diagram illustrating embodiments of the operation of the transform-based codec with energy smoothing shown in FIG. 1.

FIG. 2 is a flow diagram illustrating embodiments of the operation of the transform-based codec with energy smoothing shown in FIG. 1. The operation begins by receiving as input a block of frequency transform coefficients from an audio signal 140 being processed (box 200). This audio signal 140 is an audio signal as originally recorded and mixed by an audio engineer (or other type of content creator). In some embodiments the block of frequency transform coefficients is for a subband or partition of the audio signal 140.

The encoder 110 is used to apply both an orthogonal transformation and a vector permutation to the block of frequency transform coefficients (box 210). In some embodiments the orthogonal transformation is any power of 2 that is greater than or equal to 4. The resultant processed frequency transform coefficients then are quantized to obtain quantized processed frequency transform coefficients (box 220). The quantized processed frequency transform coefficients then are packed into an encoded bitstream 150 (box 230).

The encoded bitstream 150 is either transmitted, stored, or in some cases both transmitting and storing occur (box 240). If both storing and transmitting are performed the order in which they are performed may be storing first followed by transmitting or vice versa. The decoder 120 is used to process the encoded bitstream 150 and reverse the operations of the encoder 110 (box 250). After decoding of the encoded bitstream 150 the audio signal is recovered. In some embodiments the recovered audio signal 180 is a bit-for-bit reproduction of the audio signal. In other embodiments the recovered audio signal 180 is an approximation of the audio signal. A playback device is used to play back the recovered audio signal 180 (box 260).

Overview of Encoder Embodiments

Figure 3:
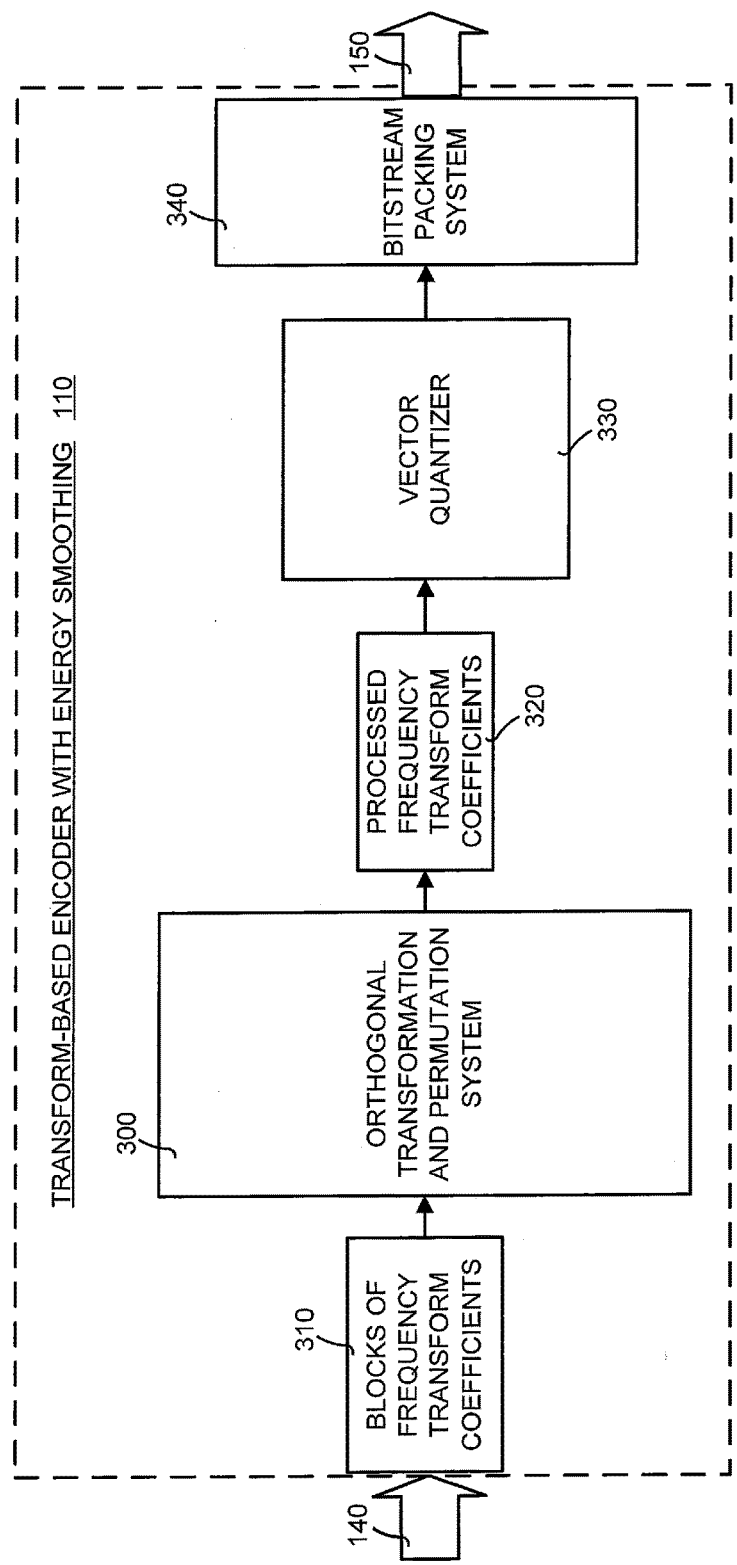
FIG. 3 is a block diagram illustrating the details of embodiments of the transform-based encoder with energy smoothing shown in FIG. 1.

FIG. 3 is a block diagram illustrating the details of embodiments of the transform-based encoder with energy smoothing shown in FIG. 1. As shown in FIG. 3, the encoder 110 includes an orthogonal transformation and permutation system 300, which is explained in detail below. The input to the encoder 110 is the audio signal 140. This signal 140 includes blocks of frequency transform coefficients 310, which are input to the orthogonal transformation and permutation system 300. In some embodiments these blocks of frequency transform coefficients 310 are normalized modified discrete cosine transform (MDCT) coefficients.

The output of the system 300 is processed frequency transform coefficients 320 that have had an orthogonal transformation and a vector permutation applied. The processed frequency transform coefficients 320 are then quantized using a vector quantizer 330 to generate quantized processed frequency transform coefficients. These quantized coefficients are packed into a bitstream using the bitstream packing system 340. The output of the encoder 110 is the encoded bitstream 150.

Overview of Decoder Embodiments

As noted above, the encoded bitstream 150 is either stored, transmitted, or both. The encoded bitstream 150 then is delivered to a receiving device containing the transform-based decoder with energy smoothing 120 for rendering. FIG. 4 is a block diagram illustrating the details of embodiments of the transform-based decoder with energy smoothing shown in FIG. 1. The decoder 120 includes an orthogonal inverse transformation and permutation system 400 that reverse the orthogonal transformation and vector permutation applied to the frequency transform coefficients. This is discussed further in detail below.

The input to the decoder 120 is the transmitted (or stored, or both) encoded bitstream 150. The encoded bitstream 150 first is unpacked using a bitstream unpacking system 410. Next, an inverse vector quantization is applied to the unpacked encoded bitstream using the inverse vector quantizer 420. This inverse quantization generates a set of received frequency transform coefficients 430, which are input to the orthogonal inverse transformation and permutation system 400. The output of the system 400 is a recovered blocks of frequency transform coefficients 440. The output of the decoder 120 is the recovered audio signal 180.

II. System and Operational Details

The details of the transform-based codec and method with energy smoothing will now be discussed. It should be noted that many variations are possible and that one of ordinary skill in the art will see many other ways in which the same outcome can be achieved based on the disclosure herein.

Encoder

Figure 5:
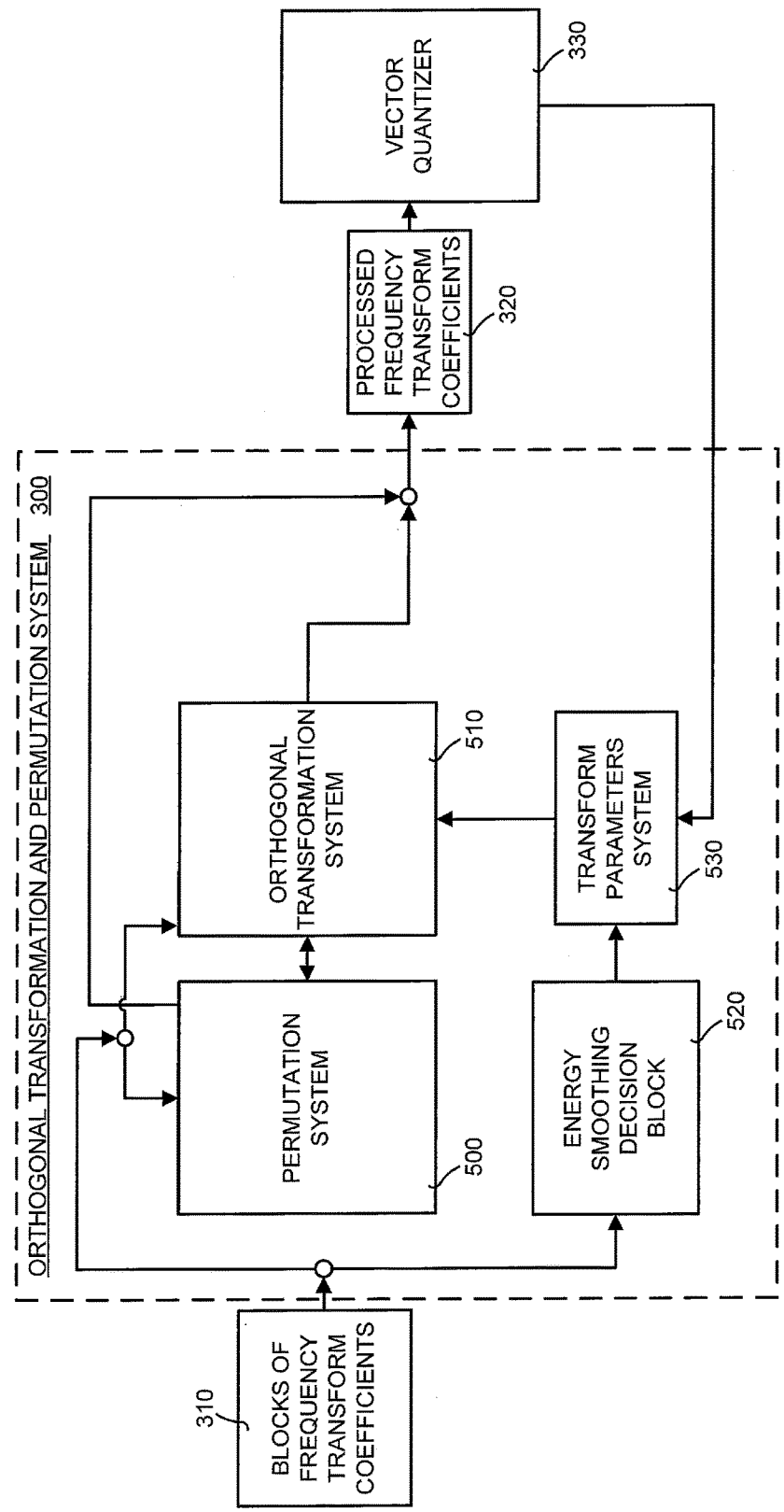
FIG. 5 is a detailed block diagram illustrating embodiments of the orthogonal transformation and permutation system shown in FIG. 3.

FIG. 5 is a detailed block diagram illustrating embodiments of the orthogonal transformation and permutation system 300 shown in FIG. 3. It should be noted that FIG. 5 illustrates exemplary embodiments of the system 300 and method contained therein and a multitude of variations are possible from that shown in FIG. 5. It should be noted that any filtering, pre-emphasis, or any other operation performed on the audio signal in the time domain is carried out prior to the audio signal being processed by the system 300.

As shown in FIG. 5, the blocks of frequency transform coefficients 310 are received by the system 300. Note that in some embodiments the coefficients are the MDCT coefficients 310, while in other embodiments the coefficient type is any variant of the discrete cosine transform (DCT) or any other frequency transform that is used by audio codecs. Irrespective of which type of frequency transform coefficients are used, they are received by a permutation system 500 and an orthogonal transformation system 510. The combination of the permutation system 500 and orthogonal transformation system 510 is a transformation process combined with a permutation process.

The order of the transformation and permutation processes in the encoder 110 is important because the order is reversed at the decoder 120. For example, at the encoder 110 if the frequency transform coefficients (such as the blocks of frequency transform coefficients 310) are processed first by the permutation system 500 and then by the orthogonal transformation system 510. Then at the decoder 120 the inverse transformation is applied followed by the inverse permutation. In some embodiments, on the encoder 110 side the frequency transform coefficients are processed first by the permutation system 500 and next by the orthogonal transformation system 510. In other embodiments, on the encoder 110 side the frequency transform coefficients are processed first by the orthogonal transformation system 510 and next by the permutation system 500. The permutation system 500 and orthogonal transformation system 510 are described in detail below.

The frequency transform coefficients are also used by an energy smoothing decision block 520. The decision block 520 first performs analysis of the signal spectrum of the frequency transform coefficients. Based on the analysis, the decision block 520 determines whether energy smoothing is necessary and, if so, then how much energy smoothing to apply. If not, then no energy smoothing is applied to the block of frequency transform coefficients.

If it is determined that energy smoothing is needed, then the decision block 520 used the analysis to determine how much energy smoothing to apply. The output of the energy smoothing decision block 520 is a smoothing parameter that specifies the level or amount of smoothing to apply. The determination as to whether to smooth the energy and the level of smoothing is a function of a number of parameters from the encoder 110. In various embodiments these parameters include any combination of a length of the subband and a number of bits available.

The energy smoothing decision block 520 sends the smoothing parameter to the transform parameters system 530. This system 530 computes a transform parameter (denoted as "x") that is used to create a transform matrix. The system 530 also receives input from the vector quantizer 330 in the form of a number of pulses. The transform parameter, x, is a function of the smoothing parameter, a length of the subband to transform, and the number of pulses of the vector quantizer 330. These transform parameters are sent to the orthogonal transformation system 510 to create a transform matrix. The output of the permutation system 500 (if the orthogonal transformation system 510 processes the frequency transform coefficients first) or the orthogonal transformation system 510 (if the permutation system 500 processes the frequency transform coefficients first) are the processed frequency transform coefficients 320 for a given subband or partition. As explained above, these processed frequency transform coefficients 320 then are quantized using the vector quantizer 330 to generate quantized processed frequency transform coefficients for the given subband or partition.

Details of the Orthogonal Transformation System

Figure 6:
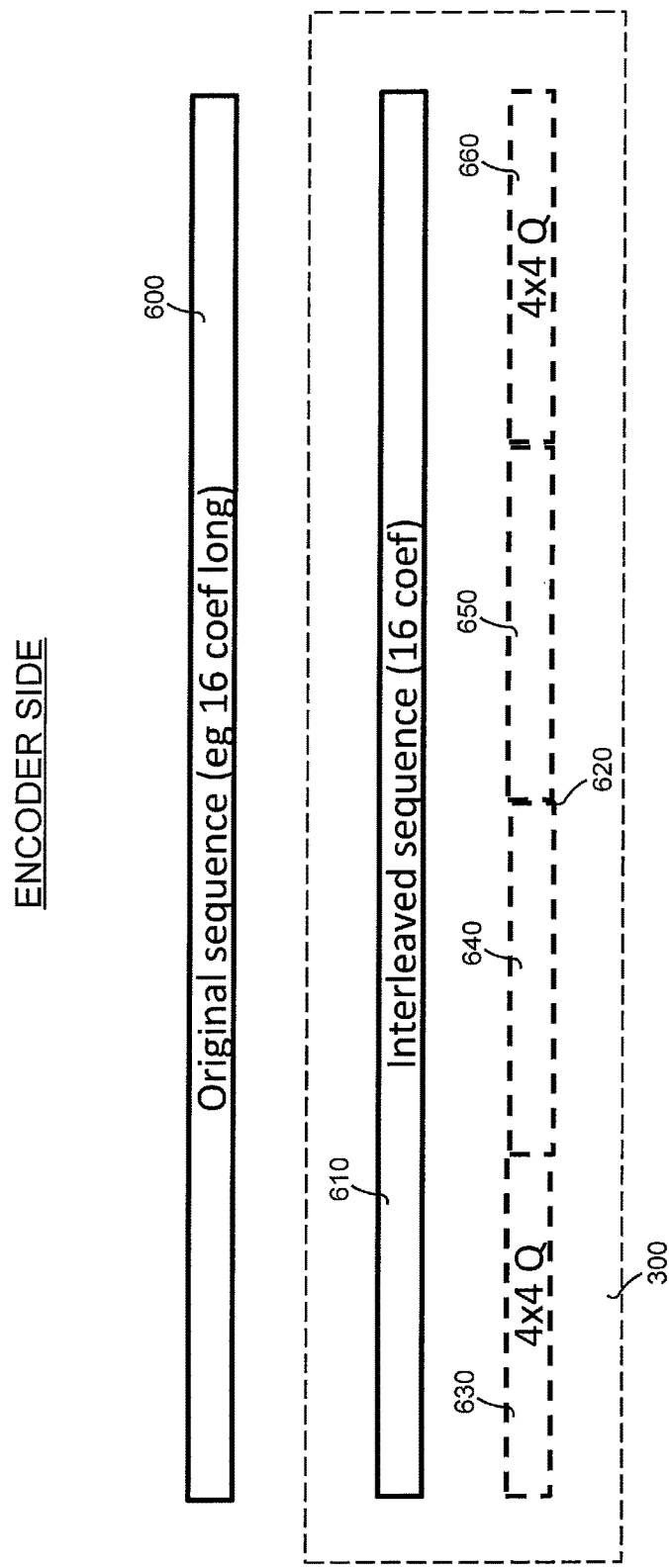
FIG. 6 is a detailed block diagram illustrating embodiments of the orthogonal transformation system interacting with the permutation system.

FIG. 6 is a detailed block diagram illustrating embodiments of the orthogonal transformation system 510 interacting with the permutation system 500. Specifically, FIG. 6 illustrates how the combination of permutation, which is interleaving in these embodiments, and transformation is applied to a frequency subband or partition. In these embodiments shown in FIG. 6 it is assumed that the length of the vector of coefficients is an integer multiple of M, where M is the size of the transform matrix. In the exemplary embodiments shown in FIG. 6 the size of M is equal to 4. Moreover, in the exemplary embodiments shown in FIG. 6 the permutation system 500 processes the frequency transform coefficients first followed by the orthogonal transformation system 510.

As shown in FIG. 6, an original sequence 600 of subband coefficients is input to the permutation system 500. In this example the length of the sequence 600 is equal to a multiple of M=4 (in this case 16 coefficients long). The first processing by the permutation system 500 is applied to the entire original sequence 600 and is an interleaving. This interleaving generates an interleaved sequence 610 that is the length of the original sequence 600 (or 16 coefficients long in this example).

Next the interleaved sequence 610 is processed by the orthogonal transformation system 510. The system 510 applies the transform matrix to each set of consecutive M points in the interleaved sequence (where M=4 in this example). This processing by the orthogonal transformation system 510 generates a processed sequence 620, which is a specific example of the processed frequency transform coefficients 320 shown in FIGS. 3 and 5. In the example shown in FIG. 6 each block of the processed sequence 620 is a 4×4 matrix of coefficients. Additionally, in this example there are 4 blocks in the processed sequence, namely a first block 630, a second block 640, a third block 650, and a fourth block 660.

Transform Matrix

In some embodiments the transform matrices are of a type from the class of fractional Hadamard matrices. The matrices meet the requirements given above and below for the transform matrix. Specifically, the matrices are orthogonal, such that $$A \cdot A^T = I,$$

energy preserving with proper normalization, and controllable.

By way of example, following is an example of a realization of the transform matrix that is a fractional Hadamard matrix of size 4 ($H_{4W}$):

$$H_{4W} = \frac{1}{\sqrt{1+c^2+d^2}} \begin{bmatrix} a & b & c & d \\ -b & a & -d & c \\ -c & d & a & -b \\ -d & -c & b & a \end{bmatrix}$$

where, $$a = \cos\left(\frac{x\pi}{4}\right), b = \sin\left(\frac{x\pi}{4}\right), c = \sin\left(-\frac{x\pi}{4}\right), d = \sin\left(\frac{x\pi}{2}\right)$$

and x is the transform parameter that ranges between 0 and 1.

By way of illustration, when x=0→no_smoothing, then the transform matrix becomes, $$H_{4W} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

When x=1→$H_{2f}$ max smoothing, then the transform matrix becomes, $$H_{4W} = \begin{bmatrix} 0.707 & 0.707 & -0.707 & 1 \\ -0.707 & 0.707 & -1 & -0.707 \\ 0.707 & -1 & 0.707 & -0.707 \\ -1 & 0.707 & 0.707 & 0.707 \end{bmatrix}.$$

Yet another variant of a fractional Hadamard matrix of size 4 is given as:

$$H_{4T} = \frac{1}{2}\begin{bmatrix} cc & cs & cs & ss \\ cs & ss & -cc & -cs \\ ss & -cs & -cs & cc \\ cs & -cc & ss & -cs \end{bmatrix}$$

where, $$cc = 1 + \cos\left(\frac{x\pi}{2}\right), cs = \sin\left(\frac{x\pi}{4}\right), ss = 1 - \cos\left(\frac{x\pi}{2}\right)$$

and x is the transform parameter.

It should be noted that several variations and other types of transform matrices are possible in addition the two examples shown above. The main requirements for the transform matrix are that it be invertible and energy preserving. Moreover, the transform matrix should be controllable (to allow some degree of smoothing) and be stable and robust to quantization noise.

Transform Parameter

The transform parameter x is computed as function of the length of the subband, N, the number of pulses, K, that are used to vector-quantize the subband, as well as the smoothing parameter, s, which is the setting for the level of smoothing desired. Mathematically, the transform parameter can be written as, $$x = e^{-3\left(\frac{K}{N}\right)^{0.73}} * \frac{1}{s(smoothing)}$$

Again, s is the smoothing parameter, which is the setting for how much or how little smooth is applied. The smoothing parameter s is determined once per frame (or for each subband). Details of the smoothing parameter s are given below.

In some embodiments the smoothing level is given as 3 discrete levels: light, medium, and high. Moreover, the values for each of the three settings are given by:
s(light)=0.35; s(medium)=0.45; s(heavy)=0.75.
The level of smoothing is communicated to the decoder 120, and both encoder 110 and decoder 120 use the smoothing parameter s to derive the exact same value for the transform parameter x.

Details of the Permutation System

In some embodiments the permutation system 500 performs interleaving. Interleaving is the process of rearranging the coefficients (or elements) of a vector according to a given rule. In some embodiments the rule is deterministic and in other embodiments the rule is probabilistic. As will be known to those having ordinary skill in the art, interleaving can be performed in a number of ways.

Figure 7:
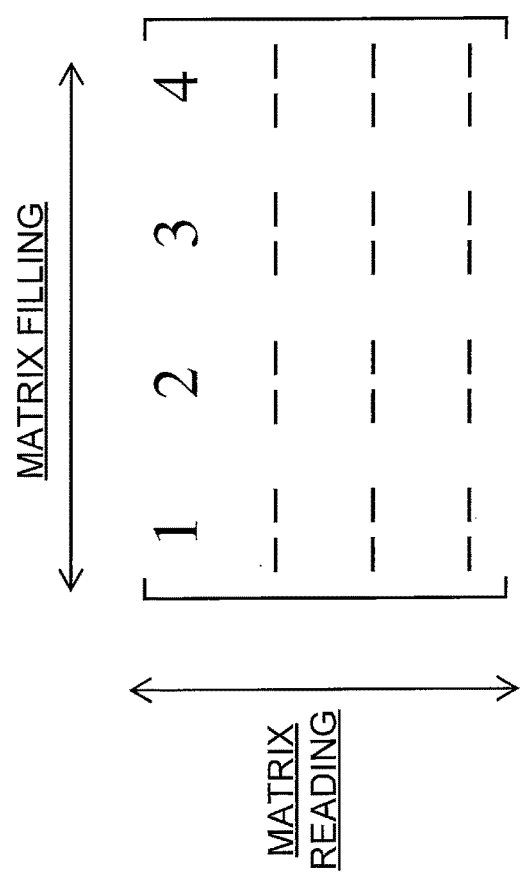
FIG. 7 illustrates an exemplary embodiment of applying a permutation using matrix-based interleaving.

FIG. 7 illustrates an exemplary embodiment of applying a permutation using matrix-based interleaving. This interleaving is performed by the permutation system 500 on the encoder 110. In this example a sequence of length P×4 is interleaved using a matrix of 4 columns and P rows. As shown FIG. 7, when interleaving the matrix is filled row wise (or along the rows) and the matrix is read column wise (or along the columns). To interleave, the matrix is filled row-wise, and read column wise.

Details of the Energy Smoothing Decision Block

Embodiments of the energy smoothing decision block 520 determine whether energy smoothing should be applied and, if so, then what degree of smoothing should be applied. In some embodiments a decision whether to apply smoothing is determined at the encoder 110 for each frame or subband. In some embodiments this decision is based on an analysis of the upper frequency spectrum and involves measuring whether this spectrum has a tonal structure or a noise-like structure.

Average Flatness Measure-Based Decision Making

In order to quantify this analysis, a flatness measure is computed for each subband and averaged across the subbands above a certain threshold (for instance above 2 kHz). If the average flatness measure is below the threshold then energy smoothing is not applied to that subband. On the other hand, if the average flatness measure is equal to or above the threshold then energy smoothing is applied to the subband.

The average flatness measure is also used to determine a level of smoothing for each frame or subband. In some embodiments there are three discrete levels of smoothing available: (1) light energy smoothing; (2) medium energy smoothing; and (3) heavy energy smoothing. Of course if the decision is to not apply energy smoothing then this is a no-smoothing level, which implies that no transformation is applied on either side.

For the spectrum flatness analysis, the upper frequency spectrum is divided into subbands. In some embodiments this can be based on a perceptual scale, such as the Bark scale. The spectrum measure of flatness is computed on the normalized MDCT bands. There are several methods that can be used to compute the flatness of the spectrum. In some embodiments the so-called entropy-based measure is computed for a given subband using the following expression:

$$\mathrm{Log}[F(X) + 1] = -\frac{1}{\log(K)} \sum_k \overline{X}(k)\log\left[\overline{X}(k)\right]$$

where K is the length (in bins) of the subband, and $\hat{X}(k)$ is the normalized (absolute) value of a given MDCT bin, given by the equation:

$$\overline{X}(k) = \frac{|X(k)|}{\sum_{k=0}^{K-1} |X(k)|}$$

where X(k) is the value of the MDCT at bin k.
The linear measure of flatness is then given as:

$$F(X) = e^{-\frac{1}{\log(K)}\overline{X}(k)\log\left[\overline{X}(k)\right]} - 1.$$

The measure is thus computed for each sub-band, and averaged over all sub-bands and channels, to yield a single measure, the average flatness measure (or "flat"). Based on this measure, in some embodiments the smoothing decision is determined from the following heuristics:

if ((flat<1.19)), then the decision=None (no energy smoothing applied);

if ((flat>=1.19) & (flat<1.25), then the smoothing decision=Light;

if ((flat>=1.25) & (flat<1.48), then the smoothing decision=Medium;

if ((flat>=1.48)), then the smoothing decision=Heavy.

Sparsity-Based Decision Making

In still other embodiments a sparsity measure of the spectrum is used to determine the level of smoothing. Similar to the above, this sparsity measure is computed on the encoder for each subband using the equations $$S = \frac{K - \frac{L_1 * L_1}{L_2}}{K - 1}$$

where, $$L_1 \sum_{k=0}^{K-1} |X(k)|$$

and, $$L_2 = \sum_{k=0}^{K-1} |X(k)|^2$$

Similar heuristics can be used to determine the level of smoothing.

Operational Details of the Transform-Based Encoder with Energy Smoothing

Figure 8:
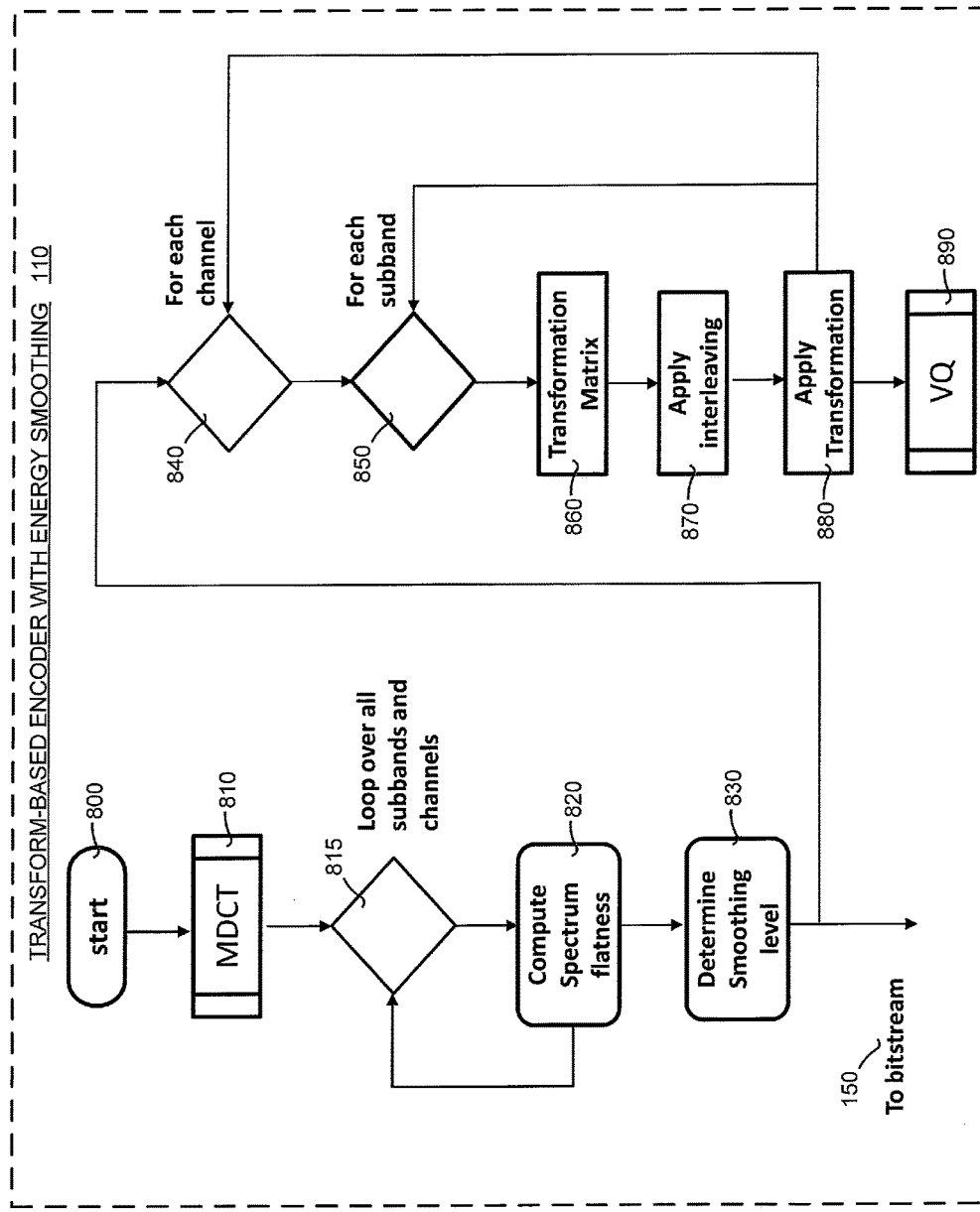
FIG. 8 is a flow diagram illustrating embodiments of the operation of the transform-based encoder with energy smoothing shown in FIGS. 1 and 3.

FIG. 8 is a flow diagram illustrating embodiments of the operation of the transform-based encoder with energy smoothing 110 shown in FIGS. 1 and 3. The operation starts (box 800) by receiving as input the audio signal 140. The audio signal 140 includes blocks of frequency transform coefficients 310, which in this example are normalized modified discrete cosine transform (MDCT) coefficients (box 810).

The encoder 110 then divides the frequency spectrum of the audio signal 140 (represented by the MDCT coefficients) into a plurality of subbands. These subbands may be of equal size or unequal size. In particular, in some embodiments the size of the subbands follow a logarithmic scale, such as the commonly used Bark scale. However, this is not required and in other embodiments the subbands are of unequal length.

Regardless of whether the subbands are of equal or unequal length, the encoder 110 loops over all of the subbands and channels (box 815). For each subband in every channel the encoder 110 computes a spectrum flatness as described above (box 820). The spectrum flatness for each subband is averaged to obtain an average flatness measure that is used to determine whether energy smoothing is applied and what level of smoothing is applied (box 830). This processing yields a smoothing parameter that contains the level of smoothing. As described above, in some embodiments there are four different levels of smoothing, namely no smoothing, light smoothing, medium smoothing, and heavy smoothing. The smoothing parameter containing the level of smoothing is contained in the encoded bitstream 150 and passed between the encoder 110 and the decoder 120.

The encoder 110 also uses the smoothing parameter for the transformation and permutation processes. The encoder 110 loops over all channels (box 840) and, within each channel, loops over all subbands (box 850). At each iteration the encoder 110 computes the transform matrix (box 860) and applies permutation, which in this example is the interleaving (box 870). The encoder 110 also applies the transform matrix for the transformation process (box 880) As discussed above, in some embodiments the transformation processing is applied first followed by the permutation processing, and in other embodiments the permutation processing is applied first followed by the transformation processing. The resultant processed MDCT coefficients then are vector quantized using the vector quantizer 330 (box 890).

Decoder

Figure 9:
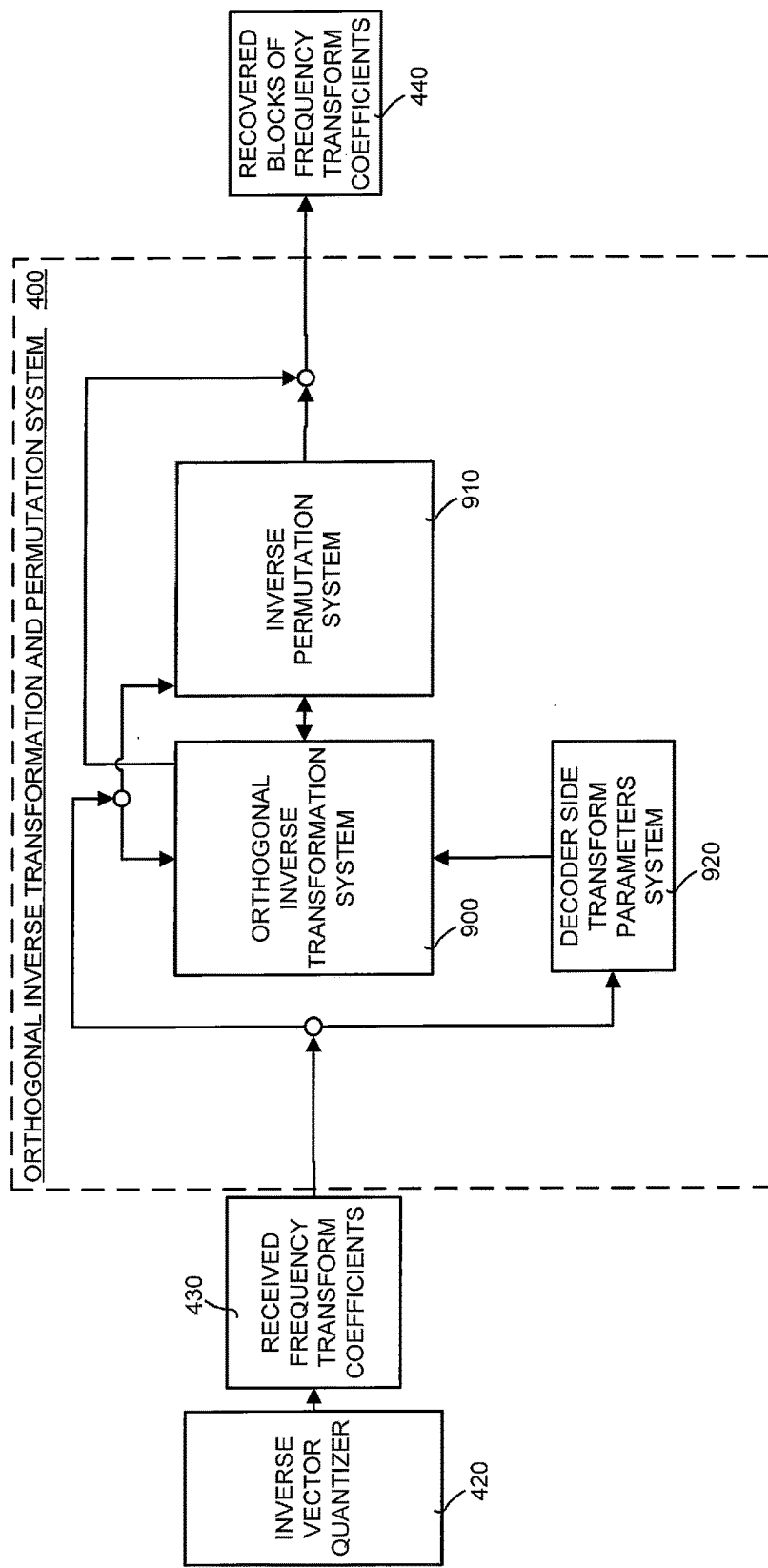
FIG. 9 is a detailed block diagram illustrating embodiments of the orthogonal inverse transformation and permutation system shown in FIG. 4.

FIG. 9 is a detailed block diagram illustrating embodiments of the orthogonal inverse transformation and permutation system 400 shown in FIG. 4. It should be noted that FIG. 9 illustrates exemplary embodiments of the system 400 and method contained therein and a multitude of variations are possible from that shown in FIG. 9.

As shown in FIG. 9, the inverse vector quantizer 420 recreates the subband coefficients based on the vectors received. The output from the inverse vector quantizer 420 is the received frequency transform coefficients 430. Input to the orthogonal inverse transformation and permutation system 300 is the received frequency transform coefficients 430.

The orthogonal inverse transformation and permutation system 300 includes an orthogonal inverse transformation system 900 and an inverse permutation system 910. It is important to note that the order in which the inverse transformation and inverse permutation is performed on the decoder 120 is dependent on the order in which the transformation and permutation were performed on the encoder 110. As noted above, whichever way was performed on the encoder 110 is reversed on the decoder 120. The inverse permutation system 910 and the orthogonal inverse transformation system 900 are described in detail below.

The decoder side transform parameters system 920 computes the transform parameter x that is used to create the transform matrix. This is the same information that is used by the transform parameters system 530 on the encoder 110. The smoothing parameter is also one of the transform parameters that was passed from the encoder 110 to the decoder 120 and is contained in the decoder side transform parameters system 920.

The orthogonal inverse transformation system 900 also inverses the frequency domain transformation performed at the encoder 110. In addition, any time domain processing performed by the encoder 110 is also reversed by the system 900. The output from the system 900 is the recovered blocks of frequency transform coefficients 440.

Details of the Orthogonal Inverse Transformation System

Figure 10:
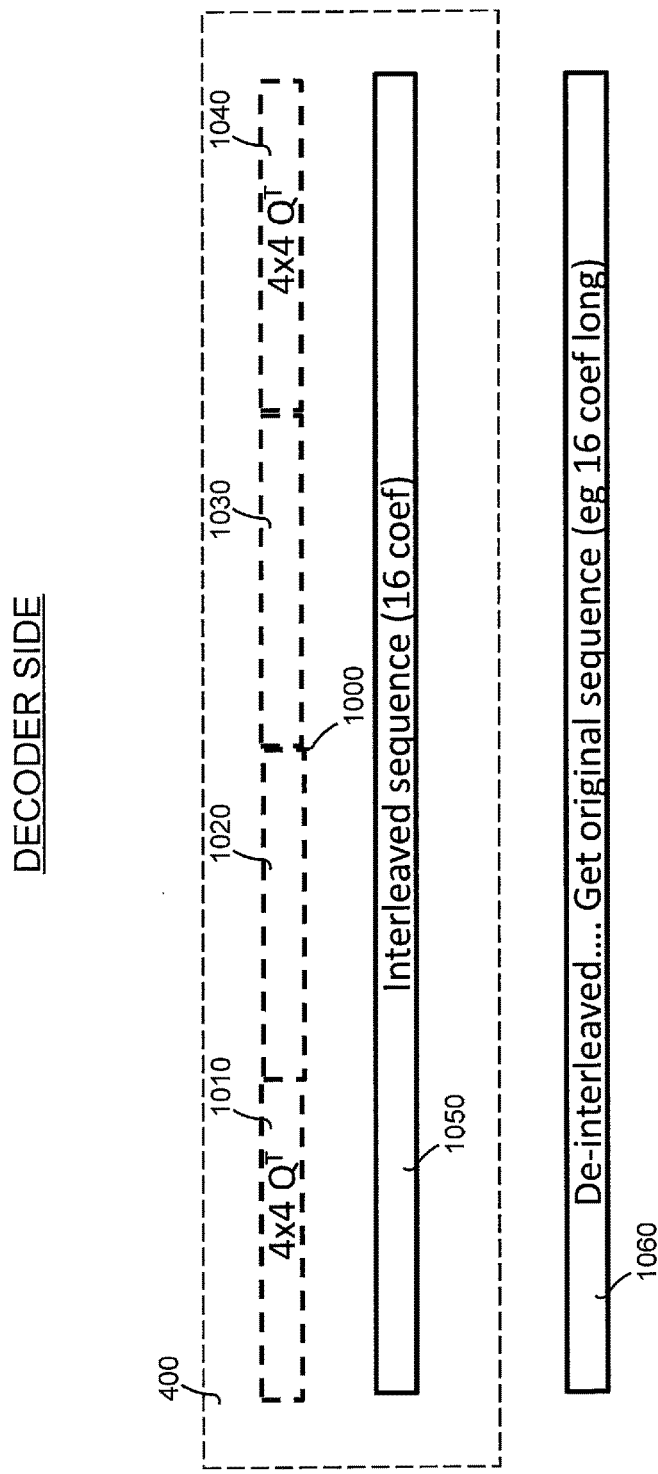
FIG. 10 is a detailed block diagram illustrating embodiments of the orthogonal inverse transformation system interacting with the inverse permutation system.

FIG. 10 is a detailed block diagram illustrating embodiments of the orthogonal inverse transformation system 900 interacting with the inverse permutation system 910. Specifically, FIG. 10 illustrates how the combination of inverse permutation, which is deinterleaving in these embodiments, and inverse transformation is applied to a frequency subband or partition. In these embodiments shown in FIG. 10 it is assumed that the length of the vector of coefficients is an integer multiple of M, where M is the size of the transform matrix. In the exemplary embodiments shown in FIG. 10 the size of M is equal to 4. Moreover, in the exemplary embodiments shown in FIG. 10 the orthogonal inverse transformation system 900 processes the frequency transform coefficients first followed by the inverse permutation system 910.

As shown in FIG. 10, a transmitted processed sequence 1000 of subband coefficients is input to the orthogonal inverse transformation system 900. In the example shown in FIG. 10 each block of the transmitted processed sequence 1000 is a 4×4 matrix of coefficients. Additionally, in this example there are 4 blocks in the processed sequence, namely a first received block 1010, a second received block 1020, a third received block 1030, and a fourth received block 1040.

The orthogonal inverse transformation system 900 applies an inverse transform matrix to generate a recovered interleaved sequence 1050 having sets of consecutive M points (where M=4 in this example). The recovered interleaved sequence 1050 then is process by the inverse permutation system 910. The system 910 deinterleaves the recovered interleaved sequence 1050 to obtain a recovered original sequence 1060. In this example the length of the sequence 1060 is equal to a multiple of M=4 (in this case 16 coefficients long).

An example of the computation of the inverse transform matrix is as follows. First, the smoothing parameter is obtained from the encoded bitstream. Next, the transform parameter x is computed. In some embodiments x is computed using the equation as given above:

$$x = e^{-3\left(\frac{K}{N}\right)^{0.73} * \frac{1}{s(moothing)}}.$$

After computing x the transform matrix is computed. As described above, in some embodiments the transform matrix is computed as:

$$H_{4W} = \frac{1}{\sqrt{1+c^2+d^2}} \begin{bmatrix} a & b & c & d \\ -b & a & -d & c \\ -c & d & a & -b \\ -d & -c & b & a \end{bmatrix}$$

where, $$a = \cos\left(\frac{x\pi}{4}\right)$$

$$b = \sin\left(\frac{x\pi}{4}\right)$$

$$c = \sin\left(-\frac{x\pi}{4}\right)$$

$$d = \sin\left(\frac{x\pi}{2}\right).$$

The inverse transform matrix is computed by taking the inverse (or the transpose) of the transform matrix, namely, $$H_{4W}^T.$$

The inverse transform matrix then is applied by the decoder. It is either preceded or following by the inverse permutation (which in this example is deinterleaving).

Details of the Inverse Permutation System

Figure 11:
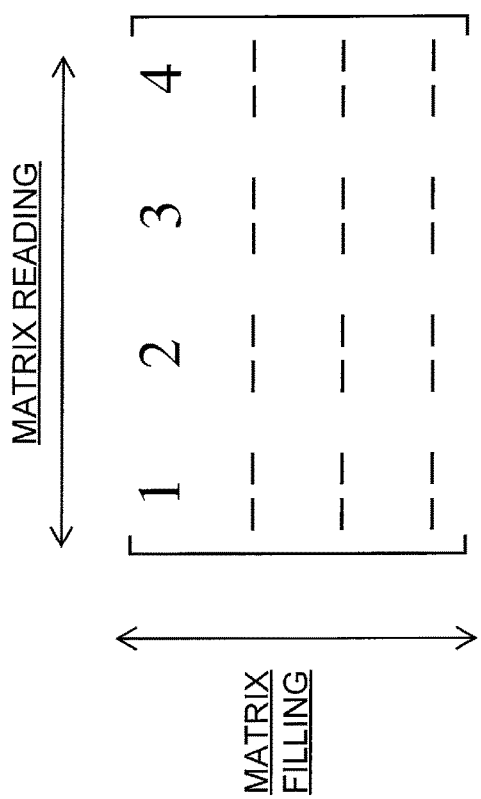
FIG. 11 illustrates an exemplary embodiment of applying an inverse permutation using matrix-based deinterleaving.

FIG. 11 illustrates an exemplary embodiment of applying an inverse permutation using matrix-based deinterleaving. This is the opposite or inverse operation to the interleaving operation shown in FIG. 7. This deinterleaving is performed by the inverse permutation system 910 on the decoder 120. In this example a sequence of length P×4 is deinterleaved using an inverse matrix of 4 columns and P rows. As shown in FIG. 11, when deinterleaving the matrix is filled column wise and is read row wise.

Operational Details of the Transform-Based Decoder with Energy Smoothing

Figure 12:
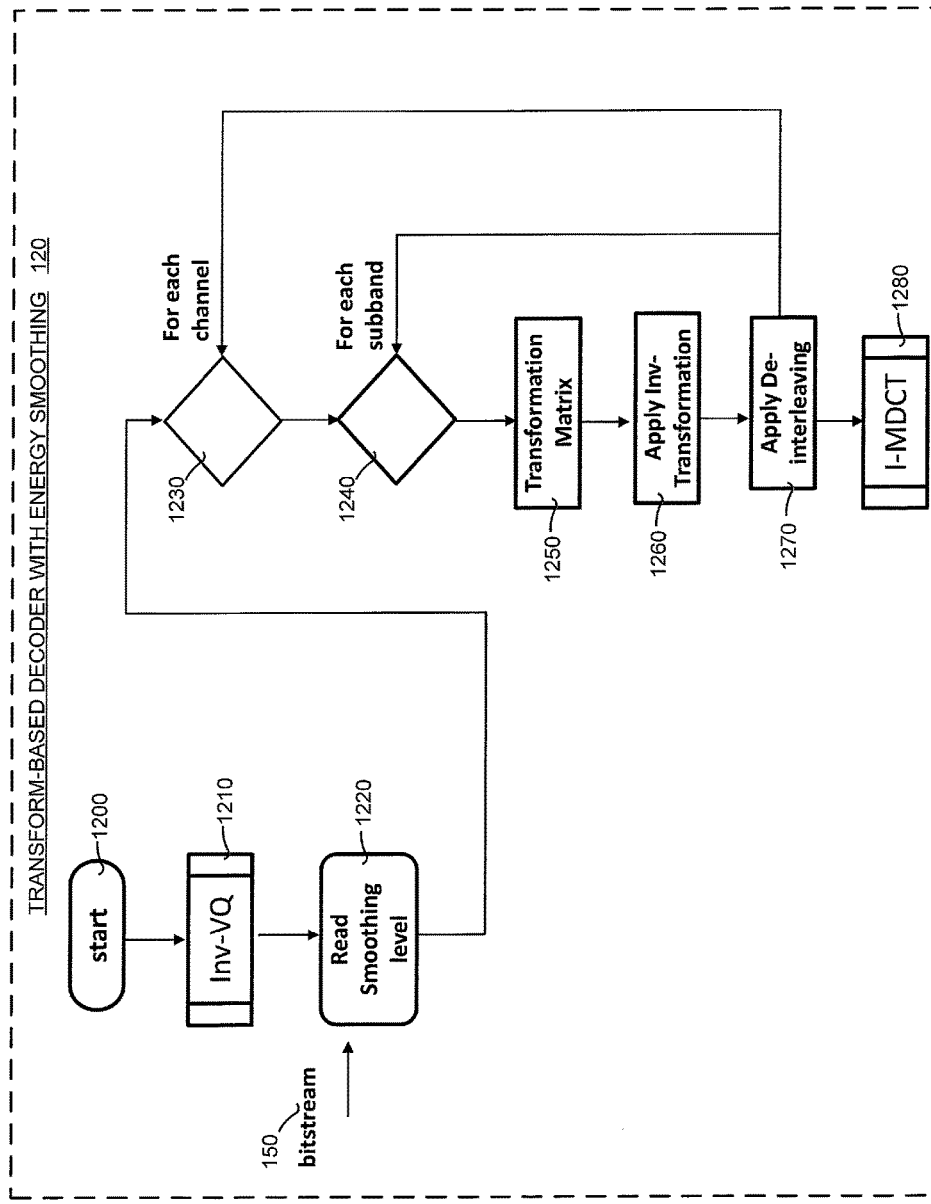
FIG. 12 is a flow diagram illustrating embodiments of the operation of the transform-based decoder with energy smoothing shown in FIGS. 1 and 4.

FIG. 12 is a flow diagram illustrating embodiments of the operation of the transform-based decoder with energy smoothing 120 shown in FIGS. 1 and 4. The operation starts (box 1200) by receiving as input the encoded bitstream 150. Inverse quantization is applied to the encoded bitstream (box 1210). The encoded bitstream 150 also includes the smoothing parameter that is passed from the encoder 110 to the decoder 120. From the smoothing parameter the decoder 120 reads a smoothing level (box 1220).

The decoder 120 then iterates over each channel (box 1230) and each subband within each channel (box 1240). For each subband in a particular channel, the decoder 120 computes the transform matrix using the received smoothing parameter (box 1250). The transform matrix is inverted to obtain an inverse transform matrix and the inverse transform matrix is applied to the received MDCT coefficients (box 1260).

The decoder 120 also applies deinterleaving to the MDCT coefficients (box 1270). The inverse transformation processing and the deinterleaving are applied by the decoder 120 in the reverse order in which they were applied by the encoder 110. The result of this inverse transformation and deinterleaving is recovered MDCT coefficients (box 1280).

III. Alternate Embodiments and Exemplary Operating Environment

Figure 13:
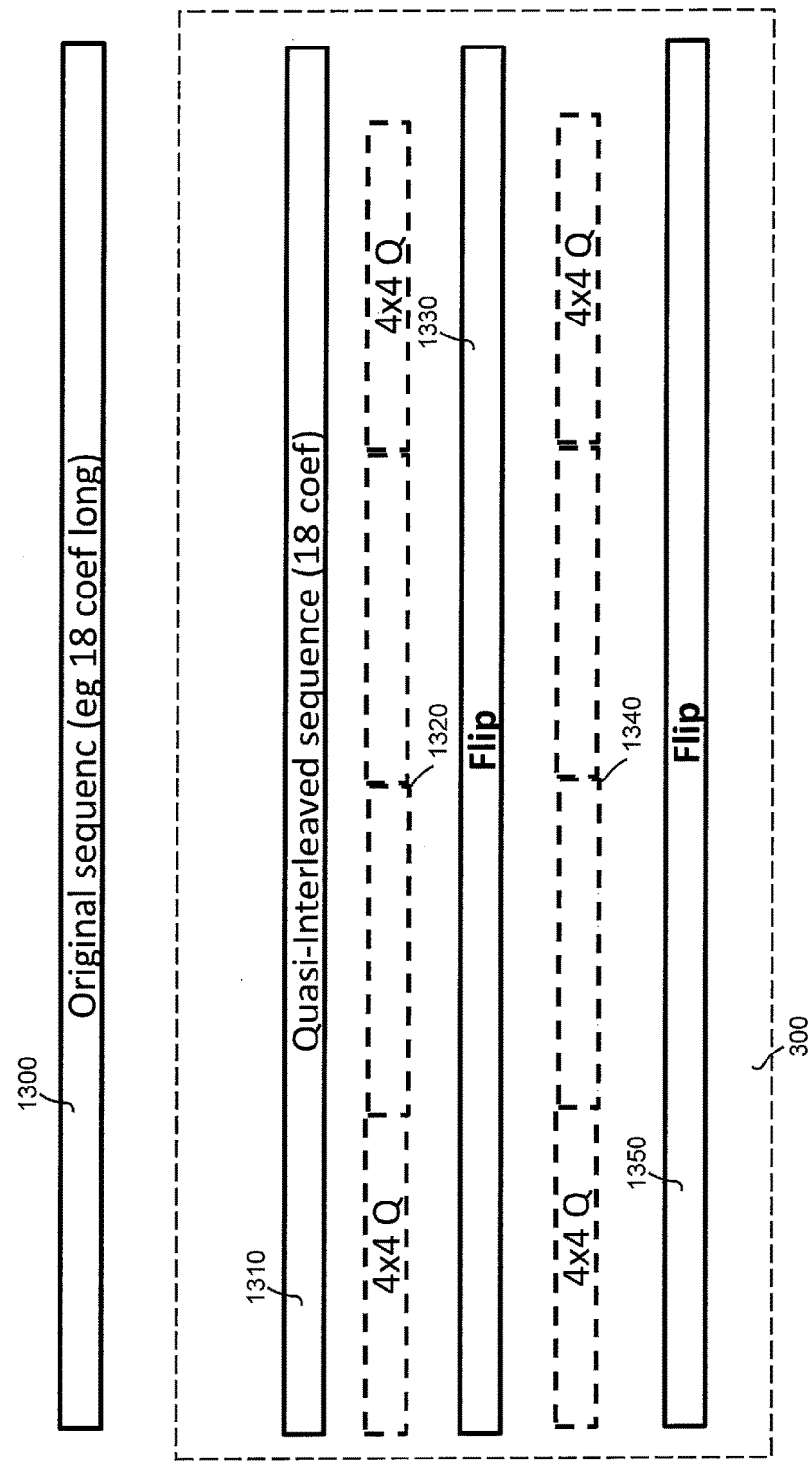
FIG. 13 is a detailed block diagram illustrating embodiments of the orthogonal transformation system interacting with the permutation system when an extended original sequence is not a multiple of M.

Alternate embodiments of the orthogonal transformation system 510 and the permutation system 500 are possible. By way of example, FIG. 13 is a detailed block diagram illustrating embodiments of the orthogonal transformation system 510 interacting with the permutation system 500 when an extended original sequence 1300 is not a multiple of M. Specifically, FIG. 13 illustrates how the combination of permutation, which is interleaving in these embodiments, and transformation is applied to a frequency subband or partition when the length of the vector of coefficients is not a multiple of M, where M is the size of the transform matrix. In the example shown in FIG. 13, M=4 and the length of the sequence 1300 is 18 coefficients.

The first part of the extended original sequence 1300 that is a multiple of M is isolated and interleaved. As in the case shown in FIG. 6 the permutation (in this case interleaving) is applied first followed by the transformation. Specifically, the extended original sequence 1300 of 18 subband coefficients is input to the permutation system 500. The processing by the permutation system 500 is applied to the number of coefficients in the extended original sequence 1300 that is a multiple of M (in this case the first 16 coefficients). The permutation in this case is an interleaving. This interleaving generates a quasi-interleaved sequence 1310 that is the length of the extended original sequence 1300 (or 18 coefficients long in this example).

Next the quasi-interleaved sequence 1310 is processed by the orthogonal transformation system 510. The system 510 applies the transform matrix to each set of consecutive M points in the quasi-interleaved sequence. In this example the transform matrix is applied to the first 4 groups of 4 coefficients. This processing by the orthogonal transformation system 510 generates a first processed quasi-interleaved sequence 1320. In the example shown in FIG. 13 the first 4 blocks of the first processed quasi-interleaved sequence 1320 is a 4×4 matrix of coefficients. In this case this means that only the first 16 points are interleaved and transformed and the last two points are not interleaved and transformed.

Because the last 2 points were not interleaved and transformed, an additional step involves flipping the extended original sequence 1300 from left to right to obtain a first flipped sequence 1330. The transform matrix is applied to the first 4 groups of 4 coefficients in the first flipped sequence 1330. This processing by the orthogonal transformation system 510 generates a second processed quasi-interleaved sequence 1340. As before, in the example shown in FIG. 13 the first 4 blocks of the second processed quasi-interleaved sequence 1340 is a 4×4 matrix of coefficients.

A final flip is performed from left to right on the second processed quasi-interleaved sequence 1340 to bring the sequence of coefficients back to its original order and generate a second flipped sequence 1350. At the decoder 120, the orthogonal inverse transformation system 900 and the inverse permutation system 910 perform the reverse operation and in the reverse order from the encoder 110. The information needed to determine the additional operation sequence of flipping the quasi-interleaved sequences is available at the decoder. Thus, no additional bits are signaled or passed from the encoder 110 to the decoder 120.

Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the transform-based codec and method with energy smoothing described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other microcontroller, or can be conventional central processing units (CPUs) having one or more processing cores, including specialized graphics processing unit (GPU)-based cores in a multi-core CPU.

The process actions of a method, process, block, or algorithm described in connection with the embodiments disclosed herein can be embodied directly in hardware, in software executed by a processor, or in any combination of the two. The software can be contained in computer-readable media that can be accessed by a computing device. The computer-readable media includes both volatile and non-volatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Bluray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

Software can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound. One way in which the audio signal is constructed by capturing physical sound. The audio signal is played back on a playback device to generate physical sound such that audio content can be heard by a listener. A playback device may be any device capable of interpreting and converting electronic signals to physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the transform-based codec and method with energy smoothing described herein, or portions thereof, may be stored, received, transmitted, or read from any desired combination of computer or machine readable media or storage devices and communication media in the form of computer executable instructions or other data structures.

Embodiments of the transform-based codec and method with energy smoothing described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

Moreover, although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing an audio signal, comprising:
   using an encoder to apply an orthogonal transformation and a vector permutation to frequency transform coefficients of the audio signal to generate processed frequency transform coefficients;
   quantizing the processed frequency transform coefficients to obtain quantized processed frequency transform coefficients;
   packing the quantized processed frequency transform coefficients into an encoded bitstream; and
   using a decoder to process the encoded bitstream and reverse operations of the encoder and recover the audio signal.

2. The method of claim 1, wherein the orthogonal transformation is any power of 2 greater than or equal to 4.

3. The method of claim 1, further comprising applying the orthogonal transformation and the vector permutation to the frequency transform coefficients only once.

4. The method of claim 1, further comprising applying the orthogonal transformation and the vector permutation to the frequency transform coefficients more than once.

5. The method of claim 1, wherein the orthogonal transformation is variable and further comprising controlling the orthogonal transformation by a smoothing parameter that is a function at least one codec metric.

6. The method of claim 1, wherein a size of a permutated sequence of the vector permutation is any value greater than or equal to a size of the orthogonal transformation.

7. The method of claim 1, further comprising applying the vector permutation to a frequency transform coefficient vector containing the frequency transform coefficients to rearrange elements of the frequency transform coefficient vector according to a permutation rule, the frequency transform coefficient vector having a vector length.

8. The method of claim 7, further comprising applying the orthogonal transformation, which is a transform matrix of size M, to the frequency transform coefficient vector.

9. The method of claim 8, further comprising applying the transform matrix to M number of points at a time of the frequency transform coefficient vector, wherein the vector length is greater than or equal to M.

10. A method for encoding an audio signal to mitigate musical noise artifacts, comprising:
dividing the audio signal into a plurality of frequency subbands;
computing a transform matrix for each subband;
applying an orthogonal transformation to frequency transform coefficients in each subband using the transform matrix and applying interleaving to the frequency transform coefficients to obtain processed frequency transform coefficients, where the orthogonal transformation is any power of 2 greater than or equal to 4; and
vector quantizing and bit packing the processed frequency coefficients into an encoded bitstream representative of the audio signal such that musical artifacts are mitigated.

11. The method of claim 10, further comprising:
computing a spectrum flatness for each subband; and
determining a smoothing parameter from the spectrum flatness that includes an energy smoothing level that represents an amount of energy smoothing to apply to each subband.

12. The method of claim 11, further comprising transmitting the smoothing parameter in the encoded bitstream from an encoder to a decoder.

13. The method of claim 11, further comprising using the smoothing parameter to compute the transform matrix.

14. The method of claim 13, wherein computing a transform matrix for each subband further comprises:
computing a transform parameter as a function of the smoothing parameter, a length of a subband being processed, and a number of pulses of a vector quantizer; and
using the transform parameter to compute the transform matrix.

15. The method of claim 10 wherein the orthogonal transformation is applied first to the frequency transform coefficients and the interleaving is applied after the orthogonal transformation is applied.

16. The method of claim 10 wherein the interleaving is applied first to the frequency transform coefficients and the orthogonal transformation is applied after the interleaving is applied.

* * * * *